United States Patent [19]

Erlich

[11] 4,263,139
[45] Apr. 21, 1981

[54] FILTER ELEMENT

[76] Inventor: Giora Erlich, 200 Winston Dr., Apt. #2920, Cliffside Park, N.J. 07010

[21] Appl. No.: 43,727

[22] Filed: May 30, 1979

[51] Int. Cl.³ .............................................. E04H 3/20
[52] U.S. Cl. .................................... 210/169; 210/485
[58] Field of Search ............... 210/460, 493 R, 493 B, 210/497.1, 478, 448, 169, 209, 457, 484, 490

[56] References Cited

U.S. PATENT DOCUMENTS

| | | | |
|---|---|---|---|
| 2,608,302 | 8/1952 | Mattei, Jr. | 210/460 |
| 2,792,943 | 5/1957 | Mackintosh | 210/169 |
| 2,985,308 | 5/1961 | Koupal | 210/169 |
| 3,104,224 | 9/1963 | Kerrisan et al. | 210/497.1 |
| 3,241,680 | 3/1966 | Humbert, Jr. | 210/493 |
| 3,302,789 | 2/1967 | Holt | 210/169 |
| 3,376,979 | 4/1968 | Bair | 210/490 |
| 3,393,806 | 7/1968 | Adelman | 210/490 |
| 3,397,793 | 8/1968 | MacDonnell | 210/490 |
| 3,486,626 | 12/1969 | Close | 210/490 |
| 3,498,464 | 3/1970 | Frosolone | 210/493 |
| 3,762,562 | 10/1975 | Okuniewski | 210/460 |
| 4,046,697 | 9/1977 | Briggs et al. | 210/490 |

Primary Examiner—Theodore A. Granger
Attorney, Agent, or Firm—Lawrence S. Lawrence

[57] ABSTRACT

An improved filter element for fluid circulating system having unpressurized reservoirs and primarily adapted for removing algae and other fine contaminants from swimming pool water comprising pleated filtration medium arranged in a cylindrical configuration having an open central area, a cap bonded to one end of the filtration medium to close the open central area, an adapter bonded to the opposite end of the filtration medium for connection to a flow source to direct the flow of water into the open central area for passage through the filtration medium in a direction from inside to outside and an outer support member disposed on the exterior of the filtration medium and closed at one end and secured at the other end to the adaptor to restrain the filtration medium. The outer support comprises a multiplicity of braided criss-cross strands of metallic or non-metallic material defining a tubular structure which is adapted to permit limited radial expansion of the filtration medium to expose the full area thereof to the flow.

4 Claims, 4 Drawing Figures

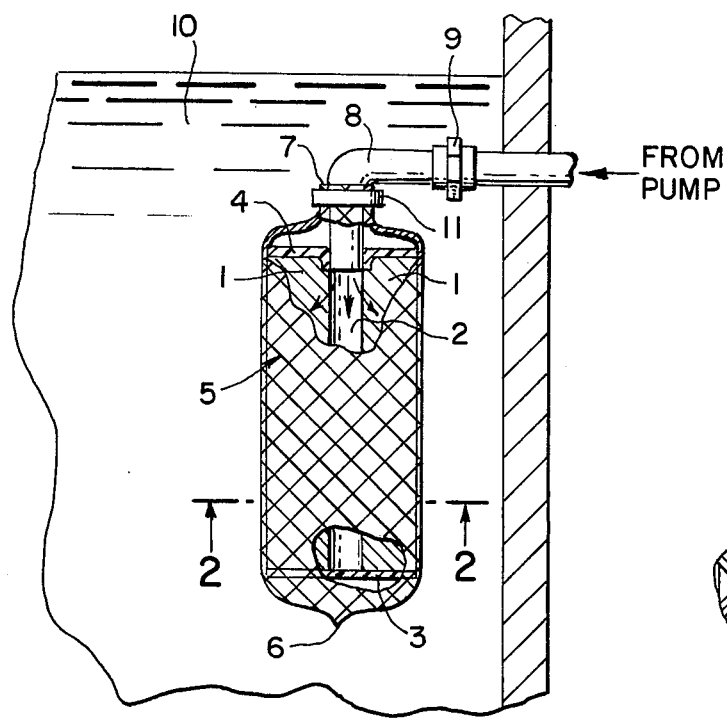
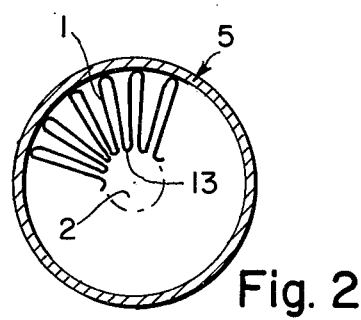
Fig. 2
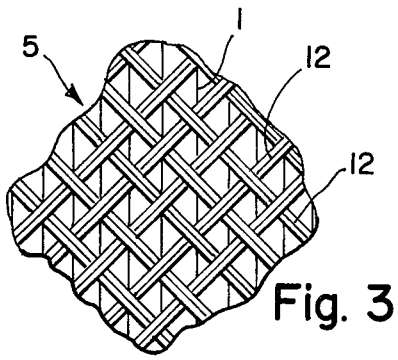
Fig. 3
Fig. 1
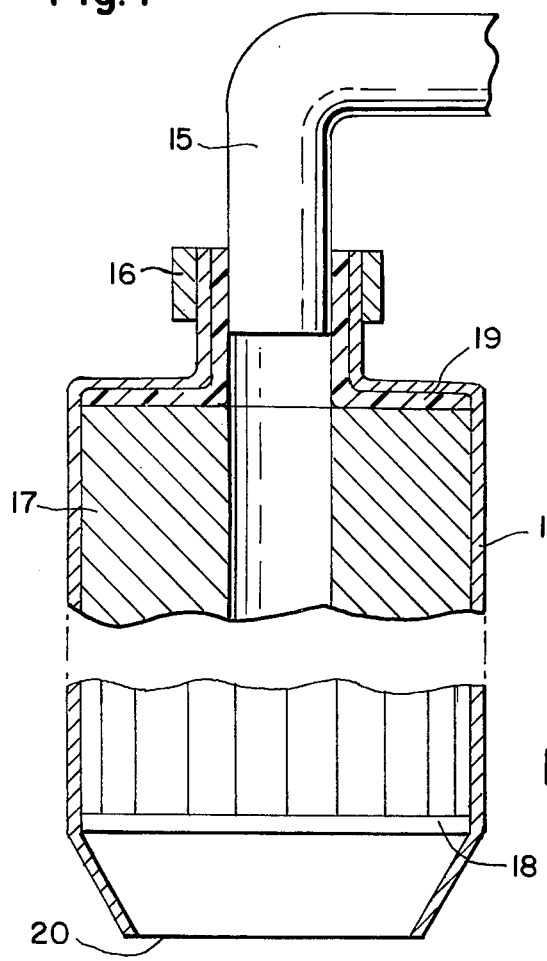
Fig. 4

FILTER ELEMENT

BACKGROUND OF THE INVENTION

This invention relates to an improved filter element adapted for clarifying and purifying large volumes of fluid, preferably water. Although the primary use of the filter of the invention is in swimming pool systems it will be apparent to those skilled in the art from the following description that the invention is not so limited, and may also be utilized in any other fluid system having an open or upressurized reservoir.

To maintain the cleanliness and clarity of swimming pool water water circulation systems containing a filter often employing sand or diatomaceous earth as the filtration medium are utilized. The flow of water passes through such filter and contaminants are gradually removed through recirculation. However, it has been found that in some instances the removal of algae and fine particulate matter is not sufficiently accomplished through the use of sand filters, and often requires other mechanical or chemical means to facilitate their removal.

To facilitate such removal through the use of a filtration material an extremely fine pore size is required and this requirement is not always met through the use of sand. It is, however, met through the use of a boundary type filtration material having fine pores formed of impregnated paper a plastic or other filtration material, such as porous metal, woven wire mesh and the like, all of which are well known in the art.

It was suggested in U.S. Pat. No. 2,792,943 to Mackintosh that a conventional sand or diatomaceous earth swimming pool filter can be replaced with a porous cloth bag having a sufficiently small pore size to permit the removal of common swimming pool contaminants. Mackintosh discloses that his proposed filtration bag can be disposed directly within the swimming pool and that flow by means of a recirculation pump can be directed through the porous material from the inside of the bag, thus eliminating the need for a housing to enclose the filter. While in theory, this concept appears advantageous, in practical use the Mackintosh filter tends to become plugged with contaminants from the pool after a very short period of use due to the lack of sufficient filter area, and would thereupon require cleaning or replacement. This creates an inconvenient situation, since a swimming pool recirculation system for maximum efficiency must be kept operating on a regular basis without the need for frequent maintenance. It follows, therefore, that in order to utilize the concept of a barrier filter disclosed within a swimming pool as set forth in the Mackintosh patent, a different type of filter must be utilized which would provide longer life and yet maintain the fine particle removal rating necessary for a swimming pool application.

The prior art teaches that increased area in a filter can be accomplished by pleating or corrugating the filtration medium and arranging the same in a cylindrical configuration. Examples of such filters can be found in U.S. Pat. Nos. 4,108,775 to Wilkes et al., 4,046,697 to Briggs et al. and 3,376,979 to Bair. However, although the filters disclosed in each of these patents can be produced with a relatively large filtration area, it can be seen in each instance that the flow is adapted to proceed from the outside of the filter to the inside, and thus the use of these filters requires a housing as is shown in Wilkes et al. If the filters of Briggs et al. or Bair were used as a replacement fo the Mackintosh bag after a short period of use as the filter material became plugged and the differential pressure thereacross increased due to the restricted flow, the pleated filter material would tend to expand and ultimately would burst, thus releasing the contaminants contained on the inside to the pool water. In both the Bair and in Briggs et al. patents the filters disclosed include an outer tubular member, however, the structures shown have insufficient strength to restrain the filter material against a high internal pressure and thus could not be utilized as suggested.

SUMMARY OF THE INVENTION

In accordance with the present invention a pleated cylindrical filter element is provided which is capable of removing algae and fine particulate matter from swimming pool water and other fluids, and overcomes the deficiencies found in the prior art The filter is constructed in a manner so as to withstand high internal pressure, yet is adapted to be connected to the return line of a swimming pool circulation system to receive the flow on the interior thereof. Accordingly, the filter of the invention can be utilized in a swimming pool without housing in the same manner as suggested by Mackintosh, but still provide long life and high filtration ability. This is accomplished primarily through the use of an outer support member which extends along the exterior of the filter and restrains the same against the buildup of internal pressure resulting from the gradual plugging of the pores of the filter. However, the outer support has the ability to permit the limited expansion of the filter material so as to permit the internal pressure to spread apart the lower portion of the pleats of the filter material, and thereby expose the full area of the filter to the flow. The support thereupon restrains the filter from further radial expansion, and thus prevents its bursting. Moreover, the outer support is constructed of a relatively open material which does not substantially interfere with the flow of water and thus does not contribute to an excessive pressure drop across the filter.

In general, the filter element of the invention comprises a pleated filtration medium arranged in a cylindrical configuration having an open central area, a cap bonded to one end of the filtration medium to close the open central area, an adaptor bonded to the opposite end of the filtration medium for connection to a flow source to direct the flow of water into the open central area for passage through the filtration medium in a direction from inside to outside, and an outer support member fixedly disposed on the exterior of the filtration medium closed at one end and secured at the other end to the adaptor to permit limited radial expansion of the filtration medium to expose the full area thereof to the flow and to restrain said filtration medium against further expansion.

Absent the outer support the filter element itself is rather conventional in appearance. However, its performance is greatly superior to conventional filters due to the fact that an increased filter area, resulting from a greater number of deeper pleats, can be provided. It can be formed from a multitude of various filtration materials, such as impregnated paper or plastic, porous stainless steel or woven wire mesh, as well as any other available material well known in the art. It differs from conventional filters, however, in that it does not contain an internal core member to support the corrugations or pleats. Such member is not required due to the fact that the flow is directed through the filter from the inside and a perforated core while providing some rigidity to the filter would interfere with the flow and increase the cost.

The end cap and the adaptor are preferably formed or molded of plastic material such as polyethylene, polypropylene, Plastisol, polyvinyl chloride or the like and is bonded by means of a resin or by the limited melting of the plastic material to the filtration medium. It will be apparent, however, that if the filter of the invention is to be used in a corrosive fluid, metallic and caps formed of stainless steel or aluminum could likewise be utilized and can be welded or braised to a metallic filtration material. In the preferred embodiment the end cap and the adaptor are formed of Plastisol material. The adaptor has an opening in the center thereof into which can be inserted a length of rigid plastic pipe adapted to be connected to the return line of a swimming pool circulation system. This permits rapid connection to the filter and its installation into a swimming pool.

The primary feature of the invention resides in the outer support member, which in the preferred embodiment comprises a multiplicity of braided criss-cross strands defining a tubular structure. The strands can be formed of fiberglass, plastic material as enumerated above or metallic wire, again depending upon the application to which the filter will be put. Such strands are disposed at an angle with respect to the longitudinal axis of the tubular structure to permit the limited expansion thereof required for the opening of the inside of the pleats. In the preferred embodiment such angle is approximately 45 degrees in the normal position of the outer support. Similarly, the strands permit the corresponding shortening of the filter due to its expansion. However, after such movement, the strands become substantially circumferential with respect to the filter and interlock to prevent further expansion and to restrain the filter against bursting. In addition, when subjected to internal pressure, the outer support is reduced in length and serves as a basket to support the end cap of the filter accordingly.

In the preferred embodiment the braided tubular support member is formed in the same manner as a sock or a stocking having one closed end, and is adapted to slip over the entire length of the filter element and be clamped at the top end by a standard hose clamp around the connection line to the return line of the swimming pool filtration system. In this manner the outer support can be reused with each replacement element. In an alternative embodiment, a rigid outer support can be provided which is disposed about the filter element spaced apart from the pleats to create an annular space therebetween. The space permits the limited expansion of the filter material to expose the full area thereof to the flow, until it contacts the support which prevents further expansion, and restrains the filter against bursting.

In swimming pool systems the filter material can be formed of dacron polyester having removal rating of approximately one micron. In this manner the filter is capable of removing algae and other fine contaminants which would otherwise pass through the conventional sand or diatomaceous earth filters. It is intended that the filter of the invention can be utilized in a relatively small swimming pool as a primary filter, since it can be made large enough to accommodate the maintenance needs. However, in larger swimming pools the filter element of the invention is best utilized as a secondary or polishing filter, together with a conventional sand filter at those times when finer filtering capability is required in order to clarify the water, such as at the begining of the season or at a time when substantial amounts of algae have been chemically killed. In swimming pool filtration systems utilizing diatomaceous earth, the filter element of the invention can be employed to prevent the diatomaceous earth powder from entering the pool, and to separate the powder and dirt from the water upon discharge.

The life of the filter element of the invention is, of course, dependent upon its area, but in view of the design such area can be made relatively large and can include in some cases up to 20 square feet of filter material in a 2½ inch diameter package and up to 150 square feet in a 4 inch diameter package. This provides extremely long life, particularly when used as a secondary filter in a swimming pool system.

The filter element of the invention is described further with reference to the annexed drawings.

BRIEF DESCRIPTION OF THE DRAWINGS

FIG. 1 is a partial cross-sectional view showing the filter of the invention installed on the return line of a swimming pool filtration system.

FIG. 2 is a cross-sectional view taken along the lines 2—2 of FIG. 1.

FIG. 3 is an enlarged partial view of the braided outer support of the filter of the invention.

FIG. 4 is a partial cross-sectional view showing a further embodiment of the filter of the invention.

DETAILED DESCRIPTION OF PREFERRED EMBODIMENT

Referring now to the drawings, it can be seen that the filter element of the invention comprises a pleated filtration medium 1 arranged in a cylindrical configuration and having an open central area 2. The pleated material 1 is contained by a pair of end caps 3 and 4 which are integrally bonded to the ends thereof to form a cartridge type filter element. End cap 3 completely encloses the filter material so that any flow entering the open central area 2 must pass through the filter material 1. End cap 4 on the other hand has an opening in the center thereof approximately concentric with central area 2 of the filter.

The filter medium 1 is formed of porous dacron polyester and has a pore size of approximately 1 micron. Accordingly, the particle removal rating of the filter is sufficiently small to prevent the passage therethrough of algae of the type that normally grows in a swimming pool and fine particulate contamination.

A tubular braided support 5 is disposed about the exterior of the filter element and is utilized to restrain the same against internal pressure. The tubular structure is in the form of a sock or bag having a closed bottom end 6 and an open top end 7.

The filter is adapted to be connected to the return line of a swimming pool filtration system by means of a fitting 8 shown in the form of an elbow, which is press-fit into the center of the opening formed in end cap 4. The elbow 8 is connected by a threaded fitting 9 to the appropriate return line of the recirculation system and the entire filter element is thus positioned in the pool below the surface of the water 10.

To hold the filter in place when the pressure on the interior thereof increases due to a buildup of contamination on the inside of material 1, the open end 7 of the tubular structure 5 is fixed in place by means of a hose clamp 11 which extends around the elbow fitting 8.

It can be seen that the flow of pool water enters the open central area 2 of the filter via fitting 8 and is directed from the inside through the filter material 1 to the water within the pool. In this manner, the filter of the invention can be utilized without a housing.

Referring now to FIG. 3, it can be seen that the tubular support 5 is comprised of a multiplicity of continuous braided strands 12 which are arranged at an angle of approximately 45° with respect to the pleats of the filter material 1. The strands 12 are arranged in a criss-crossing pattern to form a continuous cylindrical structure.

In the preferred embodiment the strands 12 are formed of polyester or fiberglass material but other materials such as polyvinyl chloride or stainless steel can also be utilized. In the embodiment shown the strands 12 are bonded together at the closed end 6 by means of heat sealing. The strands 12 of the braided tubular structure 5 are sufficiently movable with respect to each other to permit slight expansion of the support when subjected to internal pressure, and thereby permit a corresponding expansion of the pleats of the filter material 1. When this occurs the lower portion 13 of such pleats separate from one another, as shown in FIG. 2, to open the entire filter material surface to the flow, thus providing relatively long life for the filter. However, in the expanded state the strands of braided material interlock and exhibit high strength to prevent bursting of the filter as it becomes fully plugged. Moreover, the expansion of braided material 5 due to internal pressure causes a tightening of such material around end cap 4 thus further adding to the strength of the filter.

In FIG. 4 an alternate embodiment of the invention is shown which comprises a filter element having a top adaptor 13 with an upstanding neck portion 13a. Adaptor 13 is bonded to pleated filtration medium 17 in the same manner as that described with regard to the embodiment shown in FIG. 1. Similarly, an end cap 18 is bonded to the opposite end of the filtration medium. A braided outer tubular support 14 is disposed on the exterior of the element and is adapted to be secured in place at the top end thereof around adaptor 13 by means of hose clamp 16. Unlike the prior embodiment, however, support 14 is open at the bottom 20, but does extend below end cap 18.

The neck 13a of the adaptor 13 is adapted to receive therein a fitting 15 which is connected to the flow source, so that hose clamp 16 secures the entire filter element in place. In this manner, the outer support 14 performs only its primary purpose of permitting limited expansion of the pleats of filtration medium 17 to expose the full area to the flow and to restrain the same against further expansion, but does not serve to hold the filter in place.

Although the filter of the invention has been described with reference to specific embodiments, additional embodiments falling within the scope of this invention will be apparent to those skilled in the art.

What is claimed is:

1. An expansible polishing filter in combination with a swimming pool water circulation system; the system comprising a pump; and means to conduct water from the pump to the swimming pool terminating within the pool in the form of a tubular structure having an open end; and the expansible filter comprising a cylindrical pleated element; a first end cap with an opening arranged to surround the open end of the tubular structure to direct the flow to the interior of the element; a second end cap to close the element; and a braided expandible outer support sock disposed on the exterior of the element and removably secured to the tubular structure; said sock being closed at the end adjacent the second end cap and having a multiplicity of interwoven continuous strands, which are movable with respect to each other to permit limited radial expansion and longitudinal reduction thereof when subjected to internal pressure, thereby allowing corresponding radial expansion of the element to open the pleats and expose increased filter area to the flow while restraining the same against bursting and maintaining engagement between the first end cap and the tubular member.

2. An expansible polishing filter for removing contaminants from a swimming pool in combination with a water circulation system having a pump, and means terminating in an open ended tubular member to conduct water from the pump to the swimming pool; said filter comprising pleated filtration medium arranged in a cylindrical configuration with an open central area; an end cap bonded to the filtration medium to close one end of the open central area; a flow adaptor bonded to the opposite end of the filtration medium having an opening arranged to engage and surround the end of the tubular member to direct the flow of water to the open central area; and a braided expandible tubular support sock having a multiplicity of continuous criss-crossed strands disposed on the exterior of the filtration medium and removably secured to the tubular member; said strands being movable with respect to each other to provide limited radial expansion of the sock when subjected to internal pressure, thereby permitting corresponding radial expanson of the filtration medium to open the inside of the pleats to expose the full filter area to the flow, and to restrain the same against bursting.

3. A swimming pool filtration system comprising, in combination, a water circulation pump; means to conduct water from the pump terminating in an open ended tubular member; and an expansible filter juxtaposed in fluid communication between the tubular member and the swimming pool; said filter comprising a cylindrical pleated element; a first end cap with an opening for receiving the tubular member to direct the flow of water to the interior of the element; a second end cap to close the pleated element; and a braided expandable outer support sock disposed on the exterior of the element and removably secured to the tubular member; said sock being closed at the end adjacent the second end cap and having a multiplicity of interwoven continuous strands, which are movable with respect to each other to permit limited radial expansion and longitudinal reduction thereof when subjected to internal pressure, thereby allowing corresponding radial expansion of the element to open the pleates and expose the full filter area to the flow while restraining the same against bursting and maintaining engagement between the first end cap and the tubular member.

4. In a swimming pool water circulation system having a pump and means to conduct water from the pump to the swimming pool, the improvement comprising an expansible polishing filter for removing algae and other contaminants, which comprises pleated filtration medium having a pore size of approximately one micron arranged in a cylindrical configuration with an open central area; an end cap bonded to the filtration medium to close one end of the open central area; a flow adaptor bonded to the opposite end of the filtration medium having a central opening to receive one end of the means to conduct water from the pump to the pool to direct the flow of water into the open central area for passage through the filtration medium; and a braided expandable outer support sock disposed on the exterior of the filtration medium and removably secured to the end of the means to conduct water; said sock being closed at the end adjacent to the end cap and having a multiplicity of interwoven continuous strands, which are movable with respect to each other to permit limited radial expansion and longitudinal reduction thereof when subjected to internal pressure, thus permitting corresponding radial movement of the filtration medium to open the interior of the pleats, while retaining said filtration medium against bursting and maintaining engagement between the flow adaptor and the means to conduct water from the pump to the pool.

* * * * *